Aug. 26, 1969 JAMES E. WEBB 3,463,001
ADMINISTRATOR OF THE NATIONAL AERONAUTICS
AND SPACE ADMINISTRATION
THRUST DYNAMOMETER
Filed Oct. 10, 1967
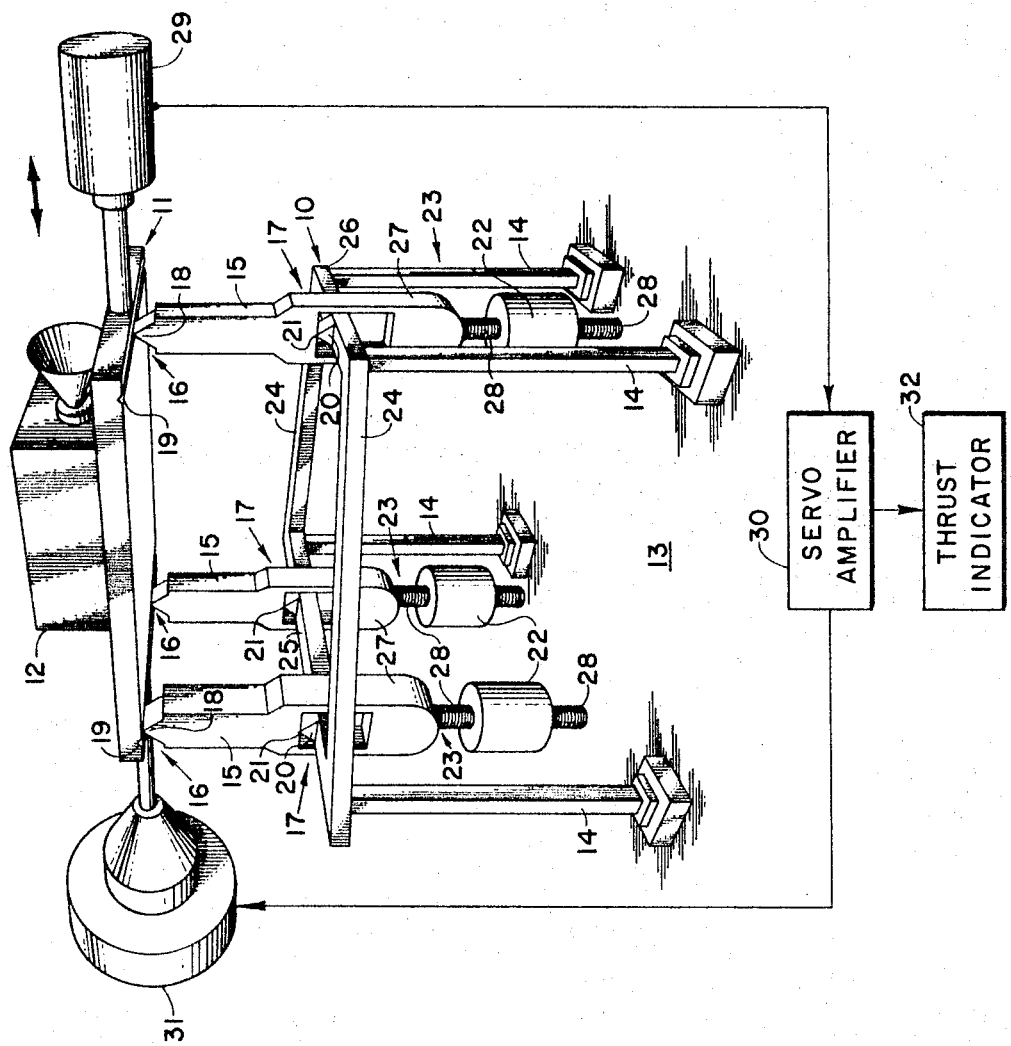
INVENTOR
SIEGFRIED HANSEN
BY
ATTORNEYS

United States Patent Office 3,463,001
Patented Aug. 26, 1969

3,463,001
THRUST DYNAMOMETER
James E. Webb, Administrator of the National Aeronautics and Space Administration with respect to an invention of Siegfried Hansen, Los Angeles, Calif.
Filed Oct. 10, 1967, Ser. No. 674,355
Int. Cl. G01l 5/12
U.S. Cl. 73—117.4                          8 Claims

ABSTRACT OF THE DISCLOSURE

A thrust stand having a movable engine mounting platform supported at three points above a fixed platform by legs having pivotal ends. Counterweights are disposed below the fixed platform and connected through rigid lever arms to the legs.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates to thrust measuring apparatus for reaction type engines and is directed more particularly to a thrust stand.

In prior art thrust stands for measuring the thrust of reaction engines, such as jet and rocket engines, it has been the practice to mount the engine on a movable platform. This movable platform is suspended from a fixed platform by suitable pivotal supports. With such an arrangement, when the movable platform is displaced by operation of the engine, it also rises vertically because of the pivot arms. Consequently, the engine and the movable platform tend to return to their original position due to their own weight in a manner similar to the action of the weight on a pendulum. This self-restoring tendency produces a horizontal force component in opposition to the force component generated by the thrust of the engine. Consequently, for accurate thrust measurements, this restoring force must be accounted for by a correction factor.

Another problem in prior art thrust dynamometers arises due to the error included in the thrust measurement as a result of the friction of the bearings of the support arms. Because of the weight of jet and rocket engines the bearings of the support arms must be quite large. As a result, a friction error is introduced into the thrust measurement. Another problem with prior art thrust stands is that any warpage or distortion of the fixed or movable platforms tends to cause binding of the bearings. This introduces an additional frictional error component into the thrust measurement.

In recent years, a great deal of interest has been generated in reaction engines of the type using nuclear fission, nuclear fusion and ion acceleration. Such engines are advantageous for use in gravitationless space but produce very small amounts of thrust ranging generally from 100 to 2000 micropounds.

Stands for measuring the thrust of these low thrust engines have generally been constructed as miniaturized versions of the stands used for large jet and rocket engines. Of course, these miniaturized stands are subject to most of the same problems as the larger stands. Additionally, because the weight of an ion acceleration engine and a thrust stand therefor is relatively low, environmental vibrations are transmitted to the movable platform through the air as well as from the base on which the fixed platform is mounted. These vibrations are manifested as a noise error component in the thrust measurement.

In view of the foregoing, it is an object of the invention to provide an improved thrust stand for reaction type engines.

It is another object of the invention to provide an improved thrust stang in which a movable platform on which an engine is mounted is supported from a fixed platform by linkages utilizing low friction bearings which are substantially unaffected by the weight of the engine.

It is a further object of the invention to provide a thrust stand in which the bearings are arranged such that distortion or warpage of either the movable or the fixed platforms has no significant effect on the thrust measurement.

Still another object of the invention is to provide a thrust stand in which environmental vibrations applied to the fixed and movable platforms are effectively damped to prevent their appearance as a noise component in the thrust measurement.

Other objects and advantages of the invention will become apparent from the accompanying description and the single figure which is a combined pictorial view of the thrust stand and a block diagram of the electrical circuitry utilized therewith.

Referring now to the single figure, it will be seen that a thrust stand built in accordance with the invention may comprise a fixed platform 10 and a movable platform 11. An ion acceleration type engine 12 is mounted on top of the movable platform 11 but may, if desired, be fastened to the underside of the movable platform 11. The fixed platform 10 is supported on a relatively solid, stable base 13 by suitable standards 14.

To the end that the movable platform 11 may be displaced in a direction along the thrust axis of the engine 12 when the engine is operating, a plurality of legs 15 are disposed between the fixed platform and the movable platform 11. One end of each of the legs 15 is connected to the movable platform 11 by a pivot bearing 16 while the other end of each of the legs 15 is connected to the fixed platform 10 by a pivot bearing 17. As shown in the figure, two of the legs 15 are positioned at one end of the thrust stand straddling the thrust axis of the engine 12. A third leg 15 located at the other end of the thrust stand is positioned directly beneath the thrust axis. Advantageously, by supporting the movable platform 11 at only 3 pivot bearing points as described above, warpage or distortion of either the movable platform 11 or the fixed platform 10, within limits, does not introduce error into the thrust measurement.

The two legs 15 at the one end of the thrust stand are of equal length. The leg 15 at the other end of the thrust stand is preferably equal in length to the other two. However, the leg at said other end of the thrust stand may be made longer or shorter than those at the one end.

Each of the thrust bearings 16 comprises a knife edge 18 disposed at the upper end of each of the legs 15 and a groove 19 formed in the underside of the movable platform 11 to engage the knife edge 18. The pivot bearings 17 are also of the knife-edge type and comprise knife edges 20 attached to the fixed platform 10 and positioned to engage respective grooves 21 formed in the lower end of each of the legs 15.

As indicated previously, it is desirable to eliminate any horizontal components of force such as that resulting from the tendency of the movable platform to return to its original position because of the pendulum effect. With the structure thus far described, an unstable condition results because the movable platform 11 is positioned above the fixed platform 10. Consequently, the weight of the movable platform 11 and the engine 12 tend to cause a displacement of the movable platform 11 away from its normal position at which the legs 15 are all substantially vertical in orientation.

To the end that movable platform 11 will be stabilized wherein no horizontal forces are applied to the movable platform due to its own weight or the weight of the engine 12, a counterweight 22 is connected through a rigid lever arm 23 to the lower end of the legs 15. While a counterweight 22 is attached to each of the legs 15, as shown in the figure, it will be understood that a single weight may be utilized by attaching it to any one of the legs 15. However, if only one counterweight is employed, its weight must be increased to compensate for the loss of weight resulting from eliminating the other weights.

In the embodiment of the invention shown in the figure, the platform 10 may be formed by side girders 24 and end girders 25, 26. Because the girder 26 supports only one of the legs 15, it may be made shorter than the girder 25 which supports two of the legs 15.

As will be seen in the drawing, the rigid lever arms 23 each include a first yoke portion 27 and a second extension portion 28. The open ends of the yoke portions 27 are attached to the lower ends of the legs 15. The extension portions 28 may be threaded into respective counterweights 22 whereby the counterweights can be adjusted. However, any suitable means for retaining the counterweights 22 on the extension portions 28 while allowing the counterweights to be raised or lowered may be employed.

To stabilize the movable platform 11, the counterweights are adjusted by lowering them to a point at which displacement of the movable platform does not produce any horizontal force thereon due to the combined weight of the platform 11 and the engine to be tested. A horizontal error component is thus eliminated from the thrust measurement and correction therefor is not required.

The counterweights 22, in addition to stabilizing the movable platform 11, substantially eliminate noise error due to background vibrations. This advantage arises because the counterweights dampen any tendency of the stand to oscillate at its natural frequency.

The thrust measuring stand is completed by electrical indicator circuit means for providing a read-out of the engine thrust. The electrical circuit may include a displacement measuring transducer 29, a servoamplifier 30, a force motor 31 and a thrust indicator 32. When the engine being tested is energized, the thrust produced displaces the movable platform 11. Consequently, the transducer 29 feeds a displacement signal to the servoamplifier 30. The servoamplifier then supplies sufficient current to the force motor 31 to restore the movable platform 11 to its original position. Since this current is a function of the engine thrust, the servo amplifier which supplies it may provide a corresponding signal to the thrust indicator 32 to read out a specific measured thrust value.

It will be understood that changes and modifications may be made to the above-described structure without departing from the spirit and scope of the invention as set forth in the claims appended hereto.

What is claimed is:

1. A stand for measuring the thrust of a reaction type engine and supported on a base, said stand comprising, in combination;

a fixed platform, means for supporting the fixed platform in space relationship above the base, a movable platform disposed above the fixed platform and parallel thereto, the engine being mounted on the movable platform, a plurality of legs disposed between the fixed platform and the movable platform to maintain a spaced relationship therebetween, each of said legs being pivotally connected at one end to the fixed platform and at the other end to the movable platform to allow movement of the latter relative to the fixed platform, at least one counterweight, at least one lever arm connected between one of said plurality of legs and said weight, said weight being disposed below the fixed platform at a distance such that said weight produces substantially no restoring force during displacement of the movable platform whereby the movable platform is stabilized and damped, electrical indicator circuit means connected to the movable platform to measure the thrust of the engine, and means for applying a restoring force to the movable platform in opposition to the thrust of the engine.

2. The structure set forth in claim 1 wherein two of the plurality of legs are positioned at one end of the thrust stand straddling the thrust axis of the engine and one of the plurality of legs is positioned at the other end of the thrust stand directly beneath the thrust axis of the engine whereby effects of distortion and warpage of the movable platform on the thrust measurement are minimized.

3. The thrust stand of claim 2 in which the two legs at the one end of the thrust stand are substantially the same length as the one of the plurality of legs at the other end of the thrust stand.

4. The thrust stand of claim 3 in which a counterweight and lever arm are attached to each of the legs.

5. The thrust stand of claim 4 in which the fixed platform is defined by girders and in which each lever arm comprises a yoke portion attached to a leg, and an extension portion attached to a counterweight in adjustable relationship.

6. The structure set forth in claim 5 in which knifeedge bearings are provided at the opposite ends of each leg.

7. The thrust stand of claim 1 in which the legs are all of substantially the same length.

8. The structure of claim 1 in which the legs are arranged in parallel relationship regardless of the displacement of the movable platform.

References Cited

UNITED STATES PATENTS

| | | | |
|---|---|---|---|
| 3,201,980 | 8/1965 | Webb | 73—117.4 |
| 3,246,512 | 4/1966 | Gyllenberg | 73—147 |

RICHARD C. QUEISSER, Primary Examiner

J. W. MYRACLE, Assistant Examiner

U.S. Cl. X.R.

73—142